73166
S. H. Cox & W. H. Pence, Corn Plow.

PATENTED
JAN 7 1868

Witnesses

Inventor
S. H. Cox
W. H. Pence
Per [illegible]
Attorneys

United States Patent Office.

S. H. COX AND WILLIAM H. PENCE, OF MATTOON, ILLINOIS.

*Letters Patent No. 73,166, dated January 7, 1868.*

---

IMPROVEMENT IN CORN-PLOUGHS.

---

*The Schedule referred to in these Letters Patent and making part of the same.*

---

TO ALL WHOM IT MAY CONCERN:

Be it known that we, S. H. COX and W. H. PENCE, of Mattoon, in the county of Coles, and State of Illinois, have invented a new and useful Improvement in Corn-Ploughs; and we do hereby declare that the following is a full, clear, and exact description thereof, which will enable those skilled in the art to make and use the same, reference being had to the accompanying drawings, forming part of this specification, in which—

Similar letters of reference indicate corresponding parts.

Our invention has for its object to improve the construction of corn-ploughs or cultivators so as to make them more simple and durable in construction, and more convenient and effective in operation; and it consists in the construction and combination of the various parts, as hereinafter more fully described.

Figure 3:
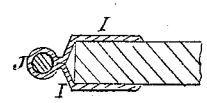
Figure 3 is a detail sectional view of the same, taken through the line $y\,y$, fig. 1.
Figure 1:
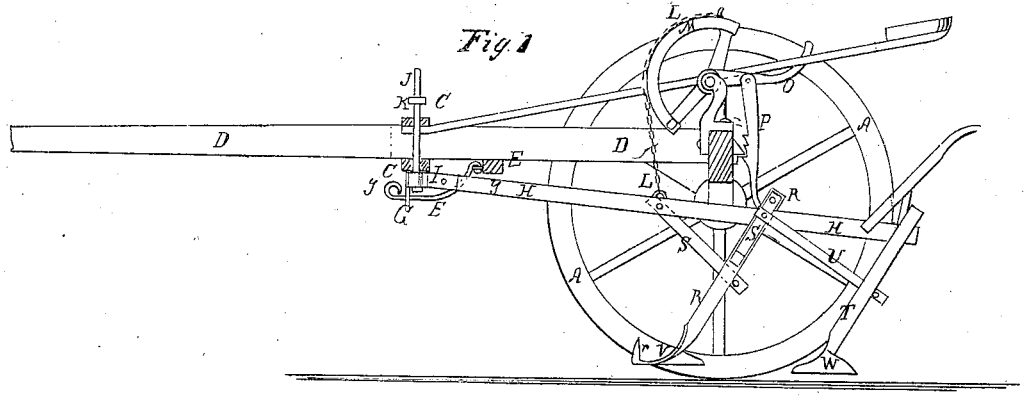
Figure 1 is a vertical longitudinal section of our improved plough, taken through the line $x\,x$, fig. 2.
Figure 2:
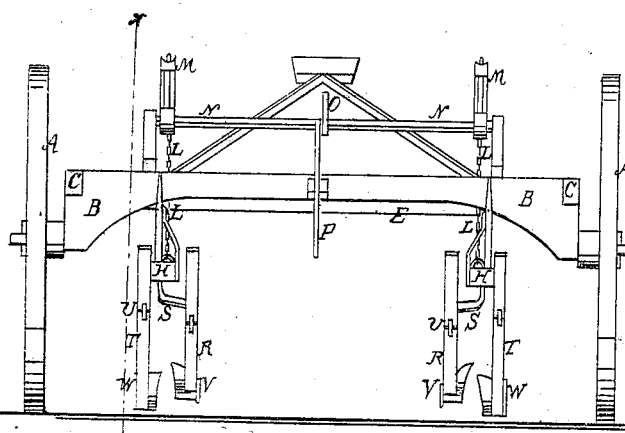
Figure 2 is a rear view of the same.

A are the wheels. B is the axle, to which the frame C is attached. D is the tongue, which is attached to the axle B and frame C. E is the double-tree, which is pivoted at its central point to the under side of the tongue D, in the rear of the front cross-bar or bars of the frame C. To the ends of the double-tree E are attached the rear ends of the rods F, which pass through one or the other of the holes formed through the bars or plates G attached to the lower side of the front cross-bar of the frame C, so that the line of draught may be adjusted as required. Upon the forward ends of the rods F are formed hooks for the attachment of the whiffle-trees. H are the plough-beams, the forward ends of which are pivoted to the clevis or strap I, which is made in substantially the form shown in figs. 1 and 3, so as to form an eye or socket for the reception of the bolt J. The bolts J pass up through the eyes or sockets of the clevises I, through the front cross-bars of the frame C, and have screw-threads cut upon their upper ends for the reception of the nuts K, so that the forward ends of the plough-beams H may be raised and lowered as required, by simply operating the said nuts K. L are chains, the lower ends of which are attached to the middle part of the plough-beams H, and the upper ends of which are attached to the upper parts of the grooved segments M, which are rigidly attached at their centres to the shaft N, so that by revolving said shaft the plough-beams and ploughs may be raised vertically out of the ground. The shaft N is operated to raise and lower the ploughs by the lever O, which is attached to it, and which projects rearward and upward into such a position as to be easily reached and operated. To the lever O is pivoted a pawl, P, having ratchet-teeth formed upon its forward side, which take hold of a catch attached to the rear side of the axle B, to hold the ploughs at any desired elevation. R are the forward plough-standards, which are attached to the inner sides of the beams H, and which are strengthened by the brace-rods S. T are the rear-plough standards, which are made longer than the standards R, and are attached to the outer sides of the beams H, and are strengthened by the brace-rods U. The ploughs V, attached to the forward standards R, and which run next to the row of corn being cultivated, have upwardly-projecting cutters $v'$ attached to their forward parts, and are so formed as to turn the dirt away from the hills. The ploughs W, attached to the rear standards T, and which run at a greater depth or at a lower level than the ploughs V, are so formed as to turn the dirt back to the hills, throwing fresh dirt around the plants.

We claim as new, and desire to secure by Letters Patent—

1. Connecting the forward ends of the plough-beams H to the frame C by means of the clevis I, constructed as described, and the long adjustable bolt J, substantially as herein shown and described and for the purpose set forth.

2. The combination of the lever O and toothed pawl P with the shaft N, grooved segments M, chains L, and beams H, in connection with the clevises I and long bolts J, for raising the ploughs vertically from the ground, substantially as herein shown and described.

3. The combination and arrangement of the ploughs V, having cutters $v'$ attached to them, and turning the dirt from the hills, ploughs W running at a lower level than the ploughs V, and turning the dirt toward the hills, standards R and T, and beams H, with each other, substantially as herein shown and described, and for the purpose set forth.

S. H. COX,
WM. H. PENCE.

Witnesses:
PETER A. HORNING,
STEPHEN E. COLLIGAN.